United States Patent
Trautmann (10) Patent No.: US 7,131,359 B2
(45) Date of Patent: Nov. 7, 2006

(54) MULTIPLE-SPINDLE LATHE

(75) Inventor: Guenther Heinrich Trautmann, Kirchheim/Teck (DE)

(73) Assignee: Index-Werke GmbH & Co. KG Hahn & Tessky, Esslingen (DE)

( * ) Notice: Subject to any disclaimer, the term of this patent is extended or adjusted under 35 U.S.C. 154(b) by 623 days.

(21) Appl. No.: 10/641,339

(22) Filed: Aug. 14, 2003

(65) Prior Publication Data
US 2004/0173063 A1  Sep. 9, 2004

(30) Foreign Application Priority Data
Mar. 6, 2003 (DE) ............................... 103 10 997

(51) Int. Cl.
*B23B 7/16* (2006.01)
(52) U.S. Cl. .......................................... 82/124; 82/117
(58) Field of Classification Search .................. 82/124, 82/117, 142, 146, 147, 148, 162, 165; 414/14
See application file for complete search history.

(56) References Cited

U.S. PATENT DOCUMENTS

| | | | | |
|---|---|---|---|---|
| 1,492,103 A | * | 4/1924 | Parkes ............................ 82/122 |
| 4,926,723 A | * | 5/1990 | Lothammer ...................... 82/118 |
| 5,027,563 A | * | 7/1991 | Naito et al. ................... 451/332 |
| 5,153,973 A | * | 10/1992 | Kitamura ...................... 29/33 P |
| 5,168,886 A | * | 12/1992 | Thompson et al. ........... 134/153 |
| 5,218,550 A | * | 6/1993 | Kato ............................. 700/192 |
| 5,239,901 A | * | 8/1993 | Lin ............................... 82/119 |
| 5,309,368 A | * | 5/1994 | Chern ........................... 700/179 |
| 5,344,264 A | * | 9/1994 | Hevoyan ...................... 409/235 |
| 5,669,751 A | * | 9/1997 | Hoffman et al. ............ 414/751.1 |
| 6,640,458 B1 | * | 11/2003 | Sawdon ......................... 33/502 |
| 6,722,236 B1 | * | 4/2004 | Baldini et al. ................ 82/117 |

FOREIGN PATENT DOCUMENTS

| | | |
|---|---|---|
| DE | 84 18 827 | 9/1984 |
| DE | 40 23 771 | 1/1992 |
| GB | 1 442 597 | 7/1976 |
| GB | 1 442 598 | 7/1976 |
| WO | 03/103892 | 12/2003 |

* cited by examiner

*Primary Examiner*—Willmon Fridie, Jr.
(74) *Attorney, Agent, or Firm*—Lipsitz & McAllister, LLC (57) ABSTRACT

In order, in a multi-spindle lathe, comprising a lathe frame, a spindle drum, which is mounted on the lathe frame such that it can rotate about a spindle drum axis and has an end face facing a working space, a multiplicity of workpiece spindles, which are mounted in the spindle drum in such a manner that they can rotate about spindle axes and have workpiece-accommodating means, which are disposed so as to face the working space and into which workpieces which are to be machined in the working space can be inserted, also to ensure that the points in time and time durations for handling workpieces involve the minimum possible loss of machining time, it is proposed that there is a pivot-arm handling device, the foot of which is disposed on an opposite side of the working space from the end face of the spindle drum and which is formed in such a way that it can be used to insert workpieces into the workpiece-accommodating means of the workpiece spindles or to remove them therefrom, through the working space.

21 Claims, 8 Drawing Sheets

MULTIPLE-SPINDLE LATHE

The present disclosure relates to the subject matter disclosed in German application No 103 10 997.8 of 6 Mar. 2003, which is incorporated herein by reference to its entirety and for all purposes.

The invention relates to a multi-spindle lathe, comprising a lathe frame, a spindle drum, which is mounted on the lathe frame such that it can rotate about a spindle drum axis and has an end face facing a working space, a multiplicity of workpiece spindles, which are mounted in the spindle drum in such a manner that they can rotate about spindle axes and have workpiece-accommodating means, which are disposed so as to face the working space and into which workpieces which are to be machined in the working space can be inserted.

Multi-spindle lathes of this type are always afflicted with the problem of making the machining of the workpieces as optimal as possible, in order as far as possible to make optimal use of the multifarious machining options of a multi-spindle lathe of this type.

For this reason, the invention is based on the object of also making the points in time for handling and the durations in time for handling of workpieces such that the minimum possible loss of machining time is entailed.

In the case of a multi-spindle lathe of the type described in the introduction, this object is achieved, according to the invention, by virtue of the fact that there is a pivot-arm handling device, the foot of which is disposed on an opposite side of the working space from the end face of the spindle drum and which is formed in such a way that it can be used to insert workpieces into the workpiece-accommodating means of the workpiece spindle or to remove them therefrom, through the working space.

The advantage of the machine tool according to the invention is therefore that it provides the option of allowing handling of the workpieces which is as efficient as possible and can be flexibly adapted to different machining jobs without restricting the options in terms of machining of the workpieces by means of the multiplicity of spindles.

Hitherto, no further details have been provided with regard to the formation of the pivot-arm handling device. Therefore, according to a particularly advantageous exemplary embodiment, the pivot-arm handling device comprises a pivot-arm base, which can rotate with respect to the foot about a foot pivot axis running transversely with respect to the spindle drum axis. This solution is particularly advantageous with regard to its kinematic configuration for rapid and efficient handling of the workpieces.

Furthermore, according to a kinematically favorable formation of a pivot-arm handling device of this type, an articulated arm with a first pivot joint, which has a first pivot axis running transversely with respect to the foot pivot axis, is mounted on the pivot-arm base, and the articulated arm includes a first arm, which leads from the first pivot axis, a second arm, which can be pivoted with respect to the first arm, by means of an articulated joint, about an axis of articulation which is parallel to the first pivot axis, and a gripper arm, which can pivot with respect to the second arm about a second pivot axis by means of a second pivot joint.

A pivot-arm handling device provided with an articulated arm of this nature is on the one hand flexible and on the other hand particularly suitable for rapid movement of the gripper arm for handling the workpieces.

To allow the pivot-arm handling unit to be able to gain access as universally as possible to workpiece spindles in the maximum possible number of spindle stations of the spindle drum, the second arm is preferably formed in such a way that it has an axis of rotation which runs transversely with respect to the axis of articulation and with respect to the second pivot axis and about which the second pivot joint can rotate with respect to the articulated joint. With the pivot-arm handling unit configured in this way, given suitable dimensions of the articulated arm, in view of the number of axes which are present, it is in principle possible to gain access to all the workpiece spindles of the spindle drum in all spindle positions.

Only in the case of non-rotationally-symmetrical parts is it even more advantageous if the gripper arm has an axis of rotation which runs transversely with respect to the second pivot axis and about which a workpiece gripper can rotate with respect to the second pivot joint.

Hitherto, no details have been provided in connection with the three-dimensional orientation of the foot pivot axis. For example, the foot pivot axis could run horizontally.

In an exemplary embodiment which is particularly advantageous for workpiece handling, the foot pivot axis runs transversely with respect to a plane defined by a base surface of the lathe frame.

It is even more advantageous if the foot pivot axis runs approximately perpendicular to the plane.

According to an embodiment which is particularly favorable with regard to the sequences of movements of the pivot-arm handling device, the foot pivot axis runs approximately in the vertical direction. This means that deviations of up to 20° with respect to a vertical orientation may occur.

Hitherto, no further details have likewise been provided, in the explanation of the individual exemplary embodiments, concerning the way in which the foot pivot axis is disposed. In the context of the invention, it is conceivable for the foot pivot axis to run laterally with respect to the lathe frame. A solution which is particularly expedient with regard to the way in which it provides access to all the workpiece spindles in all the spindle stations, provides for the foot pivot axis to be disposed opposite a central region of the end face of the spindle drum, so that the foot pivot axis can run next to the spindle drum axis on either side thereof.

It is even more favorable, in particular in order to achieve the maximum possible symmetry of the possible movements which can be carried out by the pivot-arm handling device, if the foot pivot axis runs close to the spindle drum axis.

According to a solution which is particularly expedient with regard to the symmetry which can be achieved, the foot pivot axis intersects the spindle drum axis.

In the context of the explanation of the invention which has been given to date, it is conceivable for the foot to be disposed next to the lathe frame but in a defined relationship with respect to the latter.

It is expedient for the foot to be disposed on the lathe frame, in which case the foot can be held in any desired position on the lathe frame.

A very wide range of solutions are conceivable with regard to the way in which the foot is disposed on the lathe frame. For example, it would be conceivable for the foot to be disposed on a substructure of the lathe frame.

According to a solution which is particularly expedient with regard to the handling of the workpieces and in particular the positioning of a conveyor means for the workpieces, the foot is disposed hanging from a superstructure, which extends over and beyond the working space, of the lathe frame.

Hitherto, it is also the case that no further details have been given in connection with the way in which a workpiece transfer space, in which the pivot-arm handling device can pick up or put down workpieces, is disposed. For example, on account of the flexibility of the pivot-arm handling device, in principle any desired flexible positioning of the workpiece transfer space relative to the working space, to the pivot-arm base and to the lathe frame is conceivable.

To achieve kinematics which are as favorable as possible in terms of time when handling the workpieces, it is preferable for a workpiece transfer space to be disposed at a lower level than the pivot-arm base.

With regard to the way in which the workpiece transfer space is disposed, it is particularly expedient for it to be disposed approximately at the level of a substructure of the lathe frame.

No further details have been given as to the way in which the workpiece transfer space is disposed relative to the spindle drum. By way of example, it would be conceivable for the workpiece transfer space to be placed laterally next to the spindle drum and therefore if appropriate also next to the lathe frame.

However, according to an exemplary embodiment which is particularly advantageous with regard to the kinematics, a workpiece transfer space is disposed in a region which extends in front of the end face of the spindle drum, i.e. the workpiece transfer space is likewise located in the region in which the articulated arm of the pivot-arm handling device in any case moves when it is intended to gain access to workpieces in the workpiece spindles.

To keep the distances involved in handling the workpiece as short as possible, an advantageous exemplary embodiment provides for the workpiece transfer space to be disposed between the end face of the spindle drum and the foot.

Alternatively, according to another advantageous solution, the workpiece transfer space is disposed on an opposite side of the foot pivot axis from the working space, a solution in which more space is available for the workpiece conveyor device, for example also on account of the latter being disposed outside the lathe frame.

To achieve the maximum possible flexibility also when machining different workpieces in a multi-spindle lathe of this type, it is preferable if the pivot-arm handling unit is formed in such a manner that it allows access to workpieces disposed in all the workpiece spindles.

With the pivot-arm handling device configured in this way, optimum flexibility is achieved with regard to the machining of even a very wide range of workpieces. By way of example, it is conceivable for the multi-spindle lathe in this case to be operated in such a way that workpieces are being inserted in a spindle station, are being machined via one or more subsequent spindle stations and are being removed in one of the further spindle station. However, with this solution, it is also possible, in extreme cases, for the multi-spindle lathe to be operated as a collection of single-spindle lathes and in this way, for example, for a workpiece to be inserted and removed in each spindle station. In addition, all possible machining options which constitute a combination of these two solutions described above also exist, so that in some cases it is even possible to realize different types of machining operations via different spindle stations i.e., for example, to machine different parts.

Furthermore, in the solution according to the invention, it is also possible for a handling operation for the workpiece to be carried out in one workpiece spindle while machining is still ongoing in the other workpiece spindles.

Particularly favorable sequences of movement of the pivot-arm handling device can be achieved if a control unit for the pivot-arm handling device is provided, which when conveying workpieces between the workpiece transfer space and the workpiece spindles moves the articulated arm substantially in a plane running perpendicular to the axis of the articulated arm and executes a rotation of the pivot-arm base about the foot pivot axis through less than 90°. If the pivot-arm handling device is controlled in this way, the masses which have to be moved mean that time-consuming pivoting movements about the foot pivot axis are largely avoided and the movements are substantially reduced to movements of the articulated arm, the articulation movements of which can take place more quickly than a pivoting movement of the entire articulated arm about the foot pivot axis.

According to a particularly advantageous solution, a control unit is provided, for the pivot-arm handling unit, which control unit, in order to insert and/or remove workpieces into/from the workpiece spindles, moves the pivot-arm base substantially only within an angular range about the foot pivot axis which corresponds to twice the angular range through which the pivot arm base must be rotatable in order to gain access to all the workpiece spindles in all the spindle stations.

The exemplary embodiment which has been described thus far has not provided any further detail as to how the workpieces are to be machined in the various spindle stations, and in particular as to how the tools for machining the workpieces are to be disposed.

In principle, it would be possible for tool carriers for these tools to be provided separately on the lathe frame.

According to a particularly advantageous solution, the workpiece-accommodating means for the workpieces and tool carriers for tools are disposed on the same side of the working space.

In this case, it is particularly advantageous if the tool carriers are mounted on a stand of the lathe frame which accommodates the spindle drum and therefore the stand forms both the base for the mounting of the spindle drum and the base for the tool carriers.

Further features and advantages of the invention form the subject matter of the following description and of the drawings illustrating some exemplary embodiments. In the drawings.

Figure 1:
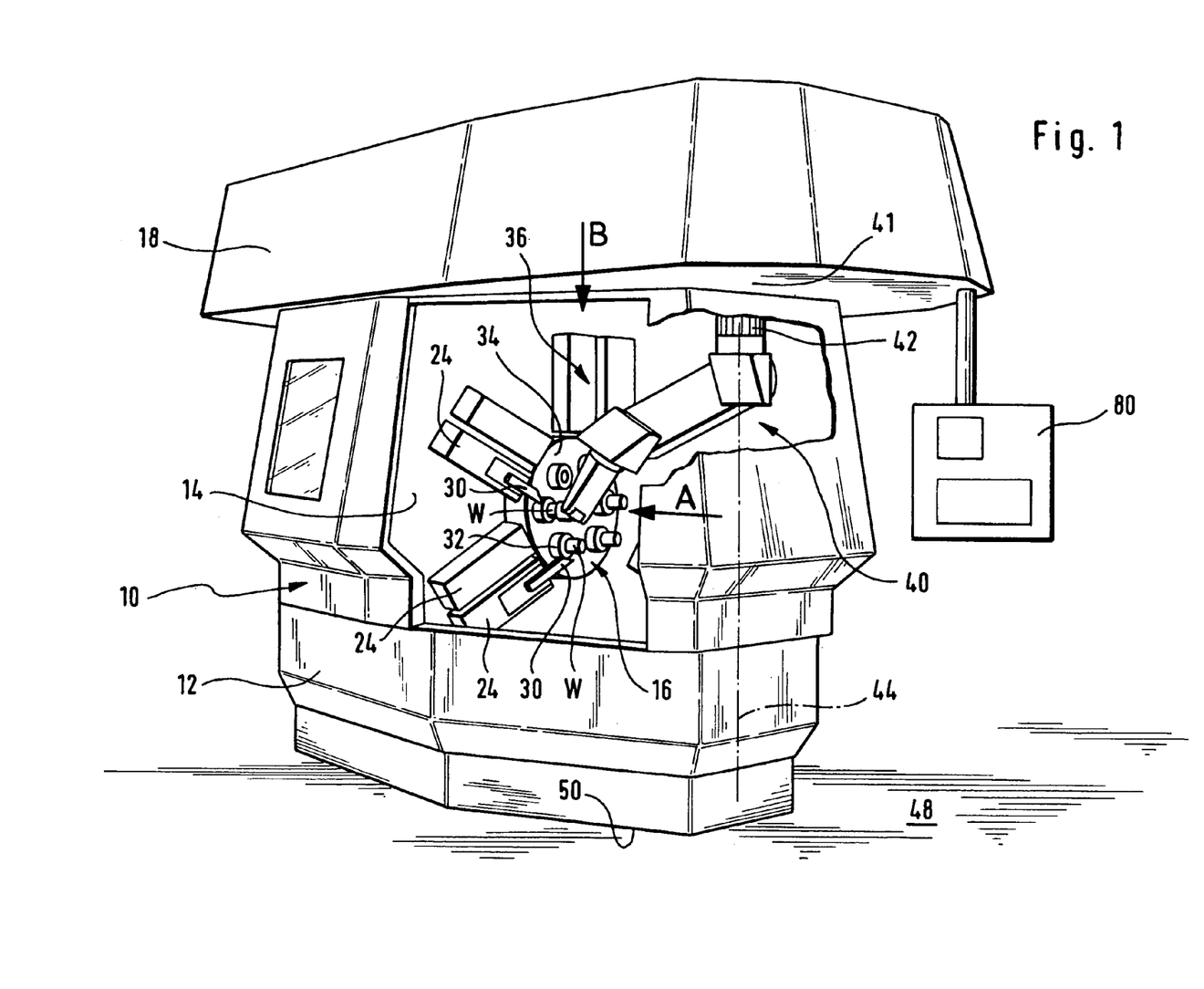
FIG. 1 shows a perspective view of a first exemplary embodiment of a machine tool according to the invention.

An exemplary embodiment of a multi-spindle lathe according to the invention, illustrated in FIG. 1, comprises a lathe frame, which is denoted overall by 10 and has a substructure 12, on which a stand 14, in which a spindle drum 16 is rotatably mounted, is disposed. Furthermore, a superstructure 18 is disposed on top of the stand 14.

Figure 2:
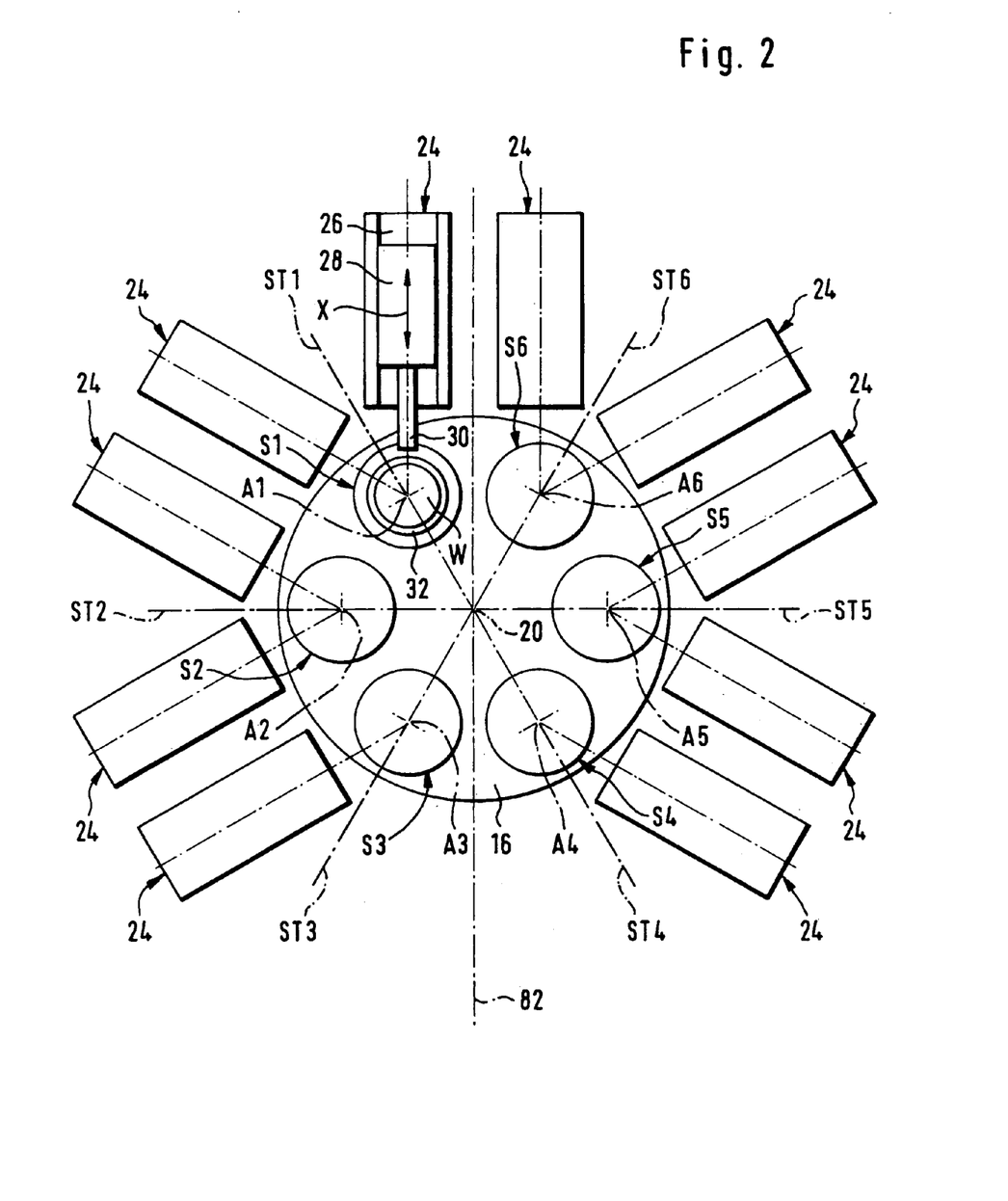
FIG. 2 shows a front view of a stand, which accommodates a spindle drum, of the lathe frame in the direction indicated by arrow A in FIG. 1.

As illustrated in FIG. 2, the spindle drum 16 can rotate on the stand 14 about a spindle drum axis 20 and has a multiplicity of workpiece spindles S1 to S6, which are preferably disposed at the same radial distance around the spindle drum axis 20 and in turn can rotate relative to the spindle drum 16 about spindle axes A1 to A6.

It is preferable for it to be possible for the spindle drum 16 to rotate about the spindle drum axis 20 with respect to the stand 14 in such a manner that the individual workpiece spindles S1 to S6 can each be moved into defined spindle stations ST1 to ST6, the spindle stations ST1 to ST6 being disposed in a stationary position relative to the stand 14, and so that, by way of example, by indexing the spindle drum 16, all the spindles S1 to S6 can be moved into the spindle station ST1.

Furthermore, at least one tool carrier 24, which comprises a carriage system having a first carriage 26, which can move relative to the stand 14 in a direction parallel to the spindle axis A in the respective spindle station ST and therefore in a Z direction, and a second carriage 28, which can move relative to the first carriage 26 in a radial direction with respect to the spindle axis A in the respective spindle station ST and therefore in an X direction, in order to allow a tool 30 for machining a workpiece 30 to move in the X direction and the Z direction, is associated with each of the spindle stations ST1 to ST6.

A multi-spindle lathe of this type is described in EP 0 834 379 A, to the entire content of which reference is hereby made.

In the multi-spindle lathe according to the invention, it is preferable for a plurality of tool carriers 24 of this type, for example two tool carriers 24 of this type, to be associated with the multi-spindle lathe according to the invention, as illustrated in the drawing on the basis of the example of spindle stations ST1, ST2, ST5 and ST6 in FIG. 2.

To accommodate a workpiece W, each of the workpiece spindles S1 to S6 is provided with a workpiece-accommodating means 32 which, depending on the workpiece W, is formed, for example, as a collet or chuck.

As illustrated in FIG. 1, the workpieces W are disposed in the workpiece-accommodating means 32 in such a manner that they project into a working space 36 located in front of an end face 34 of the spindle drum 16, with—as illustrated in FIGS. 1 and 2—both the workpiece-accommodating means 32 of the workpiece spindles S1 to S6 and the tools 30 of the individual tool carriers 24 being located on the same side of the working space 36, and the working space 36 being accessible from its other sides without this access being impeded by the tool carriers 24 and the tools 30 and by the workpiece-accommodating means 32.

For this reason, the workpieces W are handled by a pivot-arm handling device 40 which is disposed in a region 38 located in front of the end face 34 and on an opposite side of the working space 36 from the end face 34.

Figure 3:
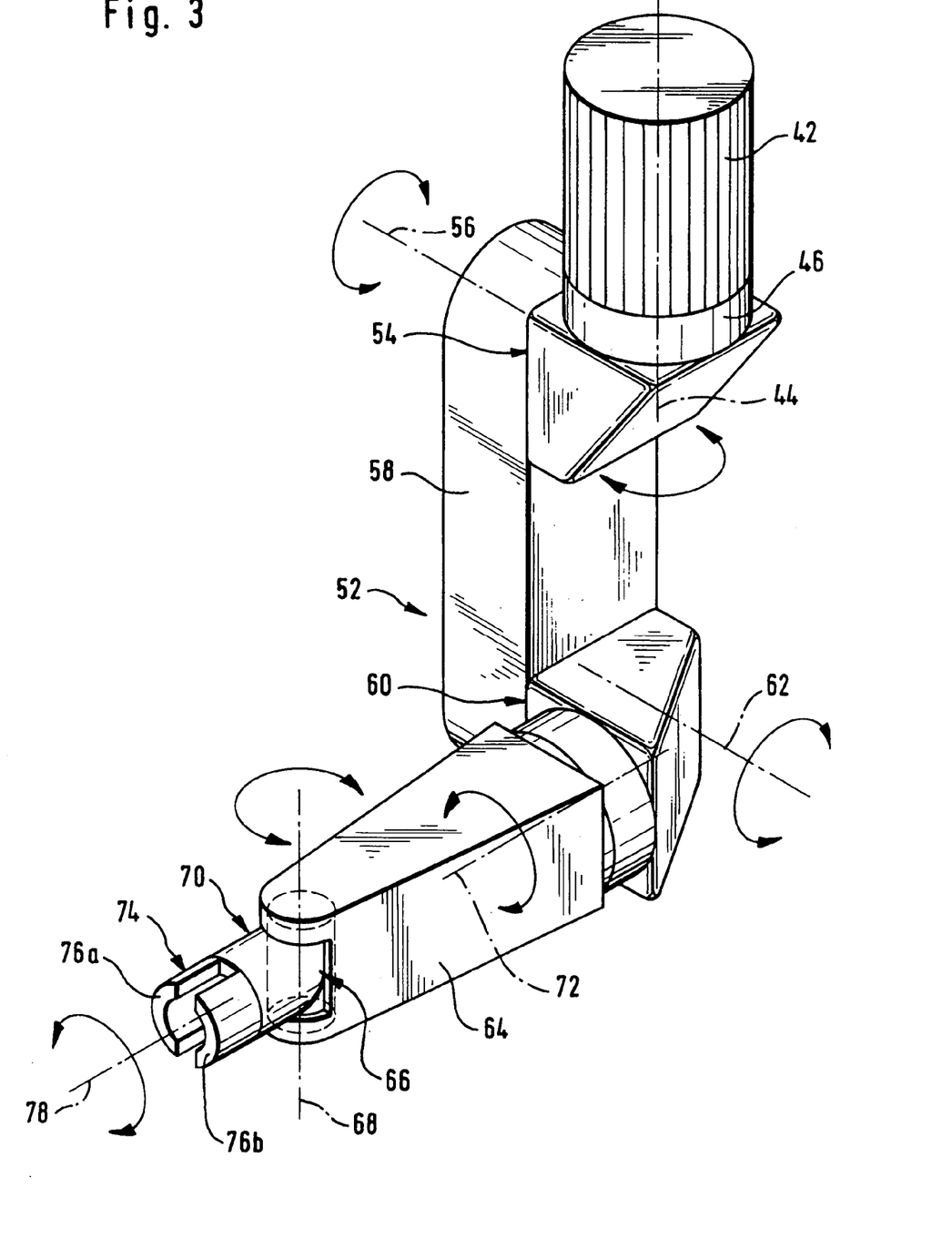
FIG. 3 shows a perspective illustration of a pivot-arm handling device in accordance with the first exemplary embodiment.

As illustrated in FIG. 1, the pivot-arm handling device 40, which, as illustrated in FIGS. 1 and 3, has a foot 42 disposed hanging from the superstructure 18 in a region 41 which extends above the working space 36, the foot 42 being mounted fixedly on the region 41 of the superstructure 18, is provided for the purpose of handling all the workpieces W which are disposed in the individual spindle stations ST1 to ST6.

A pivot-arm base 46 is mounted on the foot 42 in such a manner that it can rotate about a foot pivot axis 44, the foot pivot axis 44 running transversely with respect to a plane 48 which is defined by a base surface 50 of the lathe frame 10. It is preferable for the foot pivot axis 44 to run substantially in the vertical direction. An articulated arm, which is denoted overall by 52, is mounted pivotably on the pivot-arm base 46 by means of a first pivot joint 54, the first pivot joint 54 having a first pivot axis 56 running transversely, preferably perpendicularly, with respect to the foot pivot axis 44. The articulated arm 52 in this case comprises a first arm 58, which leads from the first pivot joint 54 and on which a second arm 64 of the articulated arm 52 is mounted pivotably by means of an articulated joint 60, which joint can pivot about an axis of articulation 62 which is parallel to the first pivot axis 56.

A gripper arm 70 is then mounted pivotably on the second arm 64, on an opposite side from the articulated joint 60, by means of a second pivot joint 66, which can pivot about a second pivot axis 68, so that overall the gripper arm 70 can pivot with respect to the second arm 64 by means of the second pivot joint 66.

Furthermore, the second arm 64 is also provided with an axis of rotation 72 which runs transversely with respect to the axis of articulation 62 and also runs transversely with respect to the second pivot axis 68, so that the second pivot joint 66 can rotate with respect to the articulated joint 60 and therefore the second pivot-arm axis 68 can rotate with respect to the axis of articulation 62, it being possible, given a perpendicular orientation of the axis of rotation 72 with respect to the axis of articulation 62 and with respect to the second pivot axis 68, for the second pivot axis 68 to be oriented so as to run parallel to the axis of articulation 62 or perpendicular to the axis of articulation 62 or in all intermediate rotational positions.

Furthermore, a workpiece gripper 74 which, by way of example, has two gripping jaws 76a, 76b for gripping the workpieces W, is provided on the gripper arm 70.

In the simplest case, the workpiece gripper 74 may be held fixedly on the gripper arm 70. However, according to a solution which is favorable for workpieces which can be gripped in a non-rotationally symmetrical manner, the workpiece gripper 74 can rotate with respect to the gripper arm 70 about an axis of rotation 78 which runs transversely with respect to the second pivot axis 68, in order in this way to enable the gripping jaws 76a and 76b to be oriented in different rotational positions relative to the second pivot axis 68.

Figure 4:
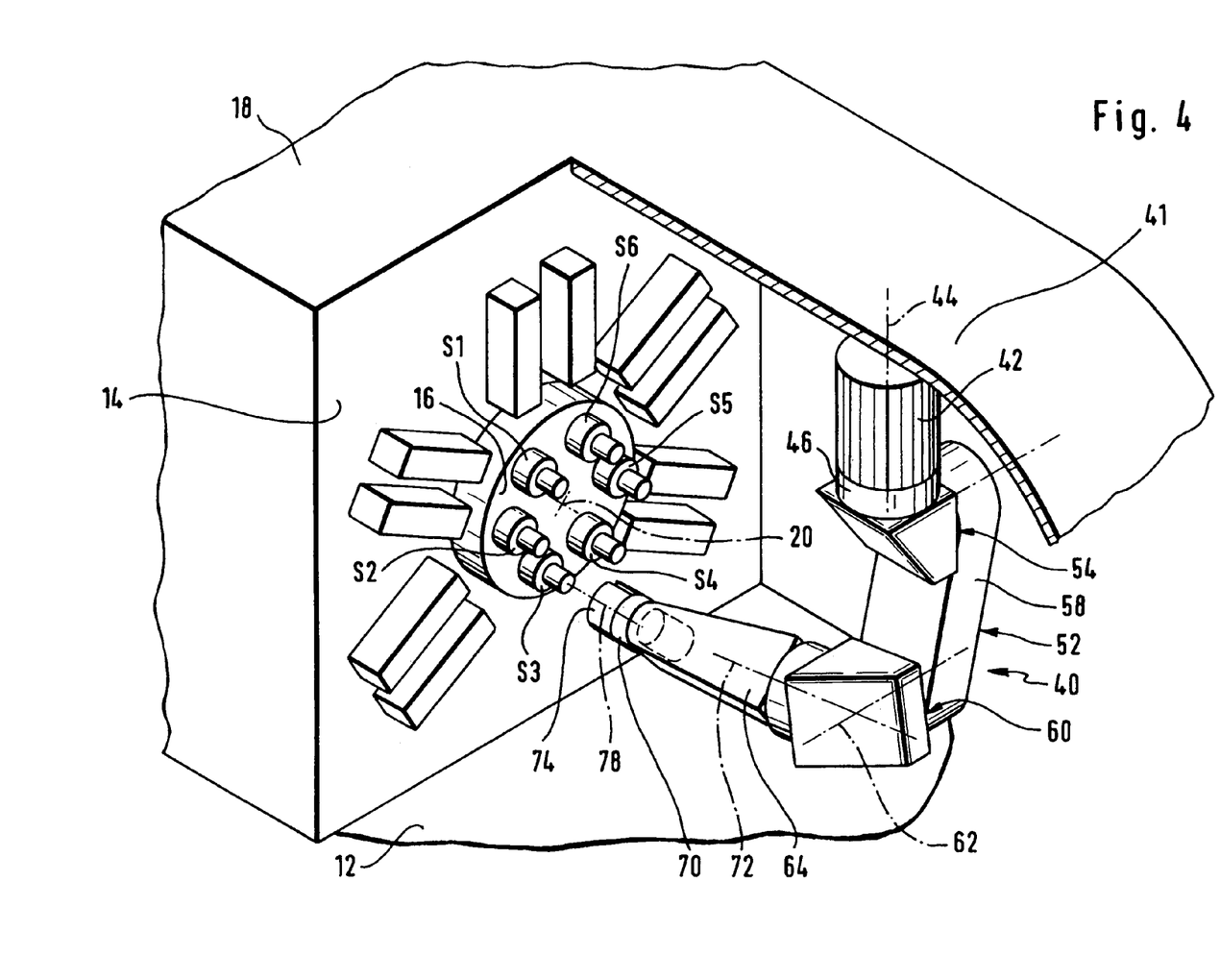
FIG. 4 shows a perspective view similar to that shown in FIG. 1 during the operation of gaining access to a workpiece in a spindle station.
Figure 5:
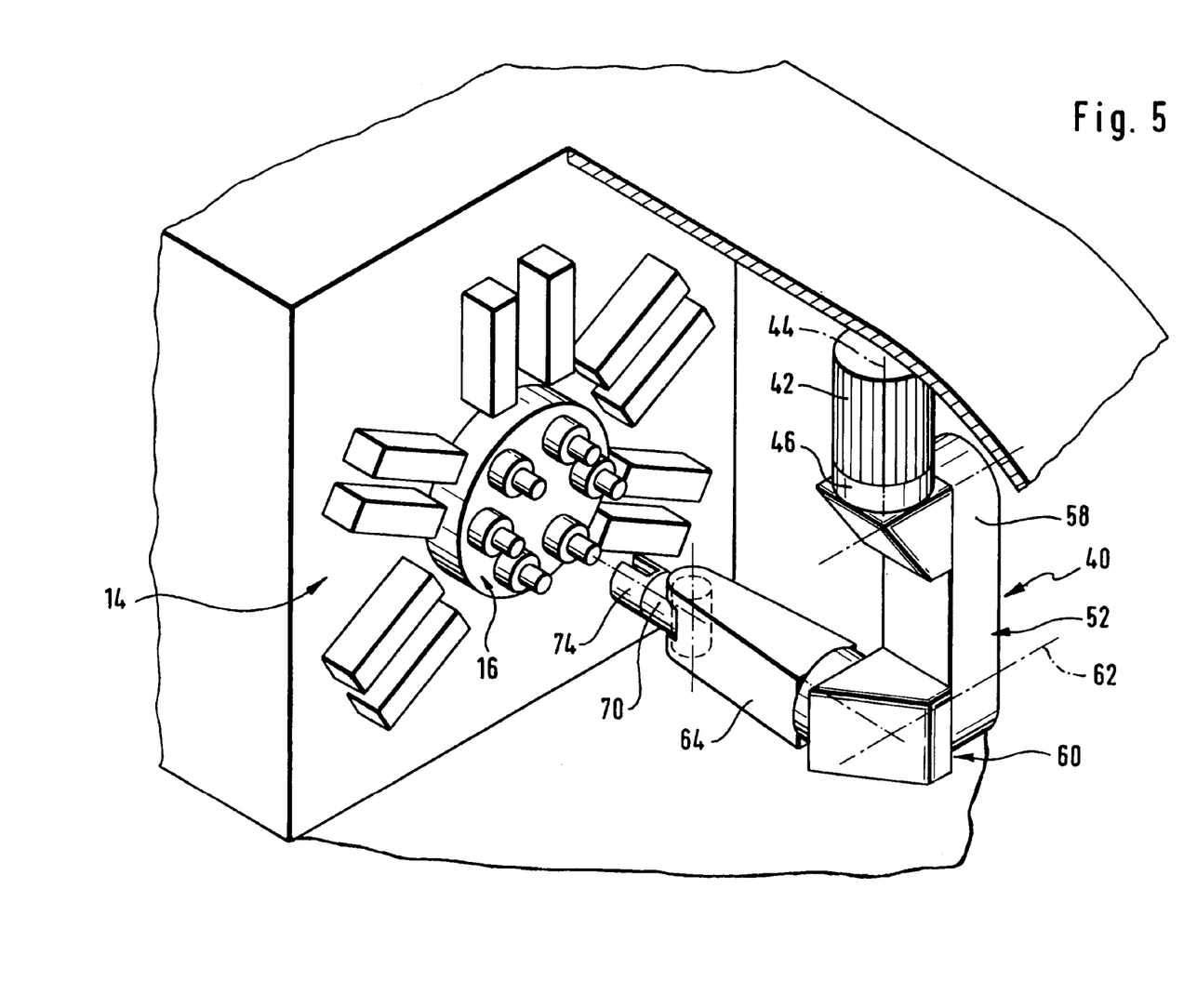
FIG. 5 shows an illustration similar to that presented in FIG. 4 when gaining access to a workpiece in another spindle station.

As illustrated in FIGS. 4 and 5, the pivot-arm handling device 40 according to the invention provides the option of the latter being moved by a control unit 80 in such a manner that, using the workpiece gripper 74, it can gain access to the workpiece spindles S1 to S6 of each of the spindle stations ST1 to ST6 of the spindle drum 16.

In the first exemplary embodiment, it is preferable for the foot 42 of the pivot-arm handling device 40 to be disposed in such a manner relative to the working space 36 that the foot pivot axis 44, which preferably runs substantially in the vertical direction, is intersected by the spindle drum axis 20, so that the foot 42 is positioned exactly centrally in front of the end face 34 of the spindle drum 16, but in such a way that the working space 36 through which the pivot-arm handling device 40 engages when it is to gain access to the workpieces W in the workpiece-accommodating means 32 is located between the foot 42 and the front face 34 of the spindle drum 16.

Figure 6:
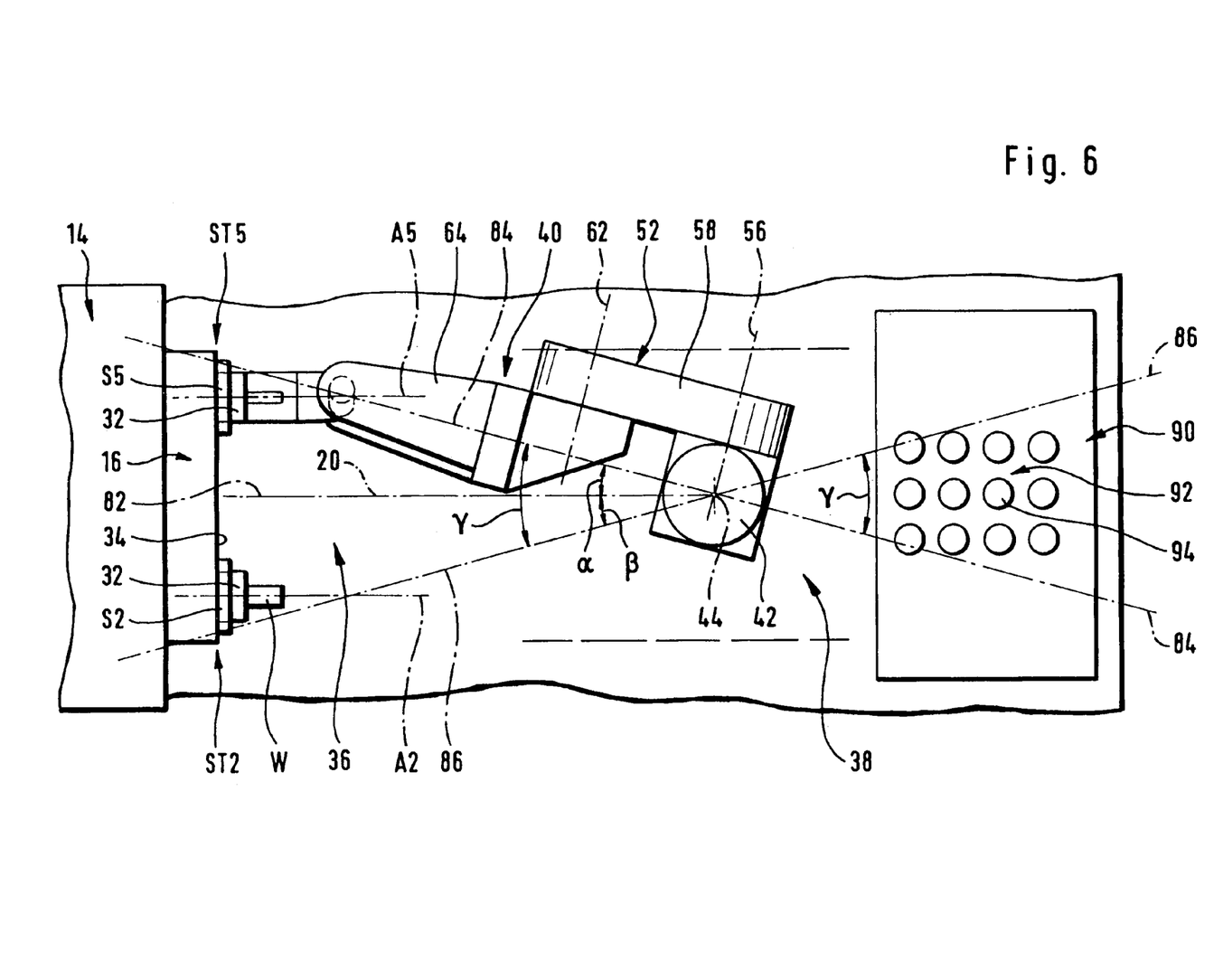
FIG. 6 illustrates the operation of gaining access to a spindle station in the direction indicated by arrow B in FIG. 1.

In this case, to gain access to the spindle stations which are at a maximum distance, in the horizontal direction, from a vertical center plane 82 running through the spindle drum axis 20, i.e. in FIGS. 2 and 6 to the spindle stations ST2 and ST5, the pivot-arm handling device 40 can be rotated about the foot pivot axis 44 in such a manner that the second arm 64, when it is gaining access to the workpiece spindle S in the spindle station ST5, is located in a plane 84 running parallel to the foot pivot axis 44, in which plane it can be moved as a result of the articulated arm 52 pivoting about the first pivot axis 56 and/or the second arm 64 pivoting about the axis of articulation 62.

The plane of movement 84 in this case runs at an angle α of less than 45° with respect to the vertical center plane 92.

In order in the same way to be able to gain access to the workpiece spindle S in the opposite spindle station ST2, the pivot-arm handling device 40 can be moved in such a manner that the second arm 64 is located and can move in a plane of movement 86 which likewise runs parallel to the foot pivot axis 44 and is inclined at an angle β of likewise less than 45° with respect to the center plane 82.

In this case, when using the same type of workpieces W, it is preferable for the angles α and β to be equal; in the case of workpieces W which project to different extents into the working space 36, the angles α and β may differ slightly.

Therefore, pivoting of the pivot-arm base 46 of the pivot-arm handling device 40 about the foot pivot axis 44 within an angle range γ which results from the sum of angles α and β is sufficient if the pivot-arm handling device 40 is to allow access to the workpieces W in all the workpiece-accommodating means 32 in all the spindle stations ST1 to ST6.

To enable workpieces W to be removed from or inserted into the workpiece-accommodating means 32 of the individual spindle stations ST1 to ST6, there is a workpiece-conveyor device, which is denoted overall by 90 and has a workpiece transfer space 92 with workpiece transfer positions 94 disposed therein in such a way that—as illustrated in FIG. 6—the minimum possible additional pivoting of the pivot-arm handling device 40 about the foot pivot axis 44 is required.

For this purpose, by way of example, as illustrated in FIG. 6, although the workpiece transfer positions 94 are disposed on an opposite side of the foot pivot axis 44 from the working space 36, they are within the angular range between the two planes of movement 84 and 86 which is defined by the angle γ, so that it is not necessary for the pivot-arm handling device 40 to be pivoted over a larger angular range about the foot pivot axis 44.

Therefore, transferring workpieces W between the workpiece transfer positions 92 of the workpiece conveyor device 90 and the workpiece-accommodating means 32 in the various spindle stations ST mainly involves a movement of the articulated arm 52, in such a manner that the second arm 64 moves substantially in the appropriate plane of movement, in the case of access to the spindle stations ST2 and ST the planes of movement 84 and 86, in order to move from the working space 36 on one side of the foot pivot axis 44 to the workpiece transfer space 92 having the workpiece transfer positions 94 disposed on the other side of the foot pivot axis 44, with only pivoting movements of the pivoting arm base 46 about the foot pivot axis 44 in an angular range of the order of magnitude of the angle γ being required in order to reach the individual workpiece transfer positions 94 within the workpiece transfer space 92.

Figure 7:
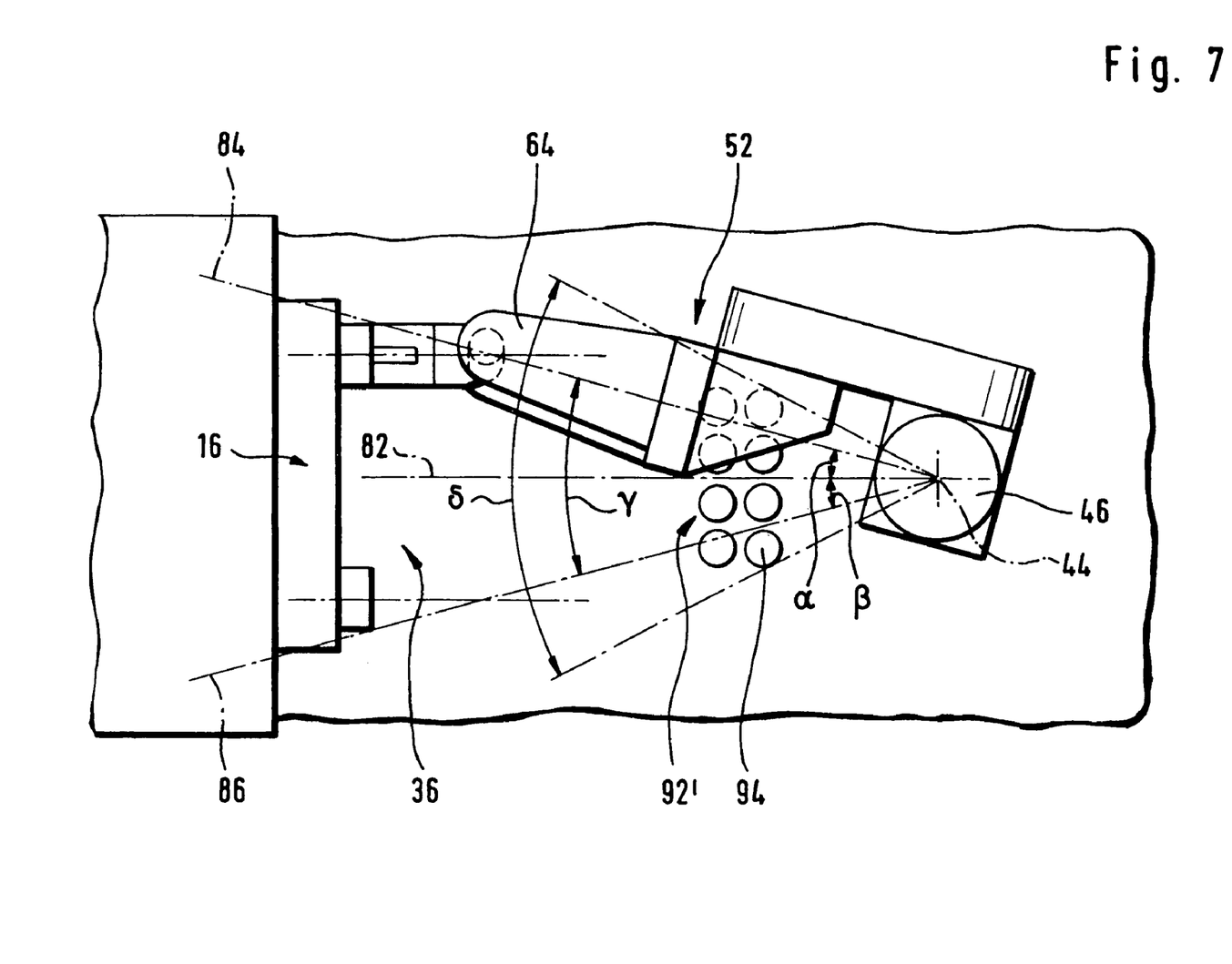
FIG. 7 shows an illustration similar to that presented in FIG. 6 for a second exemplary embodiment of a multi-spindle lathe according to the invention.

In a second exemplary embodiment of a multi-spindle lathe according to the invention, illustrated in FIG. 7, the workpiece transfer space 92' is disposed on the same side of the foot pivot axis 44 as the working space 36, but in this exemplary embodiment the workpiece transfer space 92 is located in such a manner that the minimum possible amount of pivoting of the pivot arm base 46 about the foot pivot axis 44 is required to reach all the workpiece transfer positions in the workpiece transfer space 92.

By way of example, in addition to the movement of the second arm 64 in the appropriate plane of movement 84 or 86, at most a slight additional pivoting movement beyond the angular range γ is required, meaning that the maximum movement about the foot pivot axis 44 takes place in an angular range δ which is less than double, and even more preferably less than 1.5 times, the angular range γ.

Otherwise, the second exemplary embodiment of the multi-spindle lathe according to the invention includes the same parts as the first exemplary embodiment, and consequently the same reference symbols are used for the same parts and otherwise reference is made in full to the explanations which have been given above in connection with the first exemplary embodiment.

Figure 8:
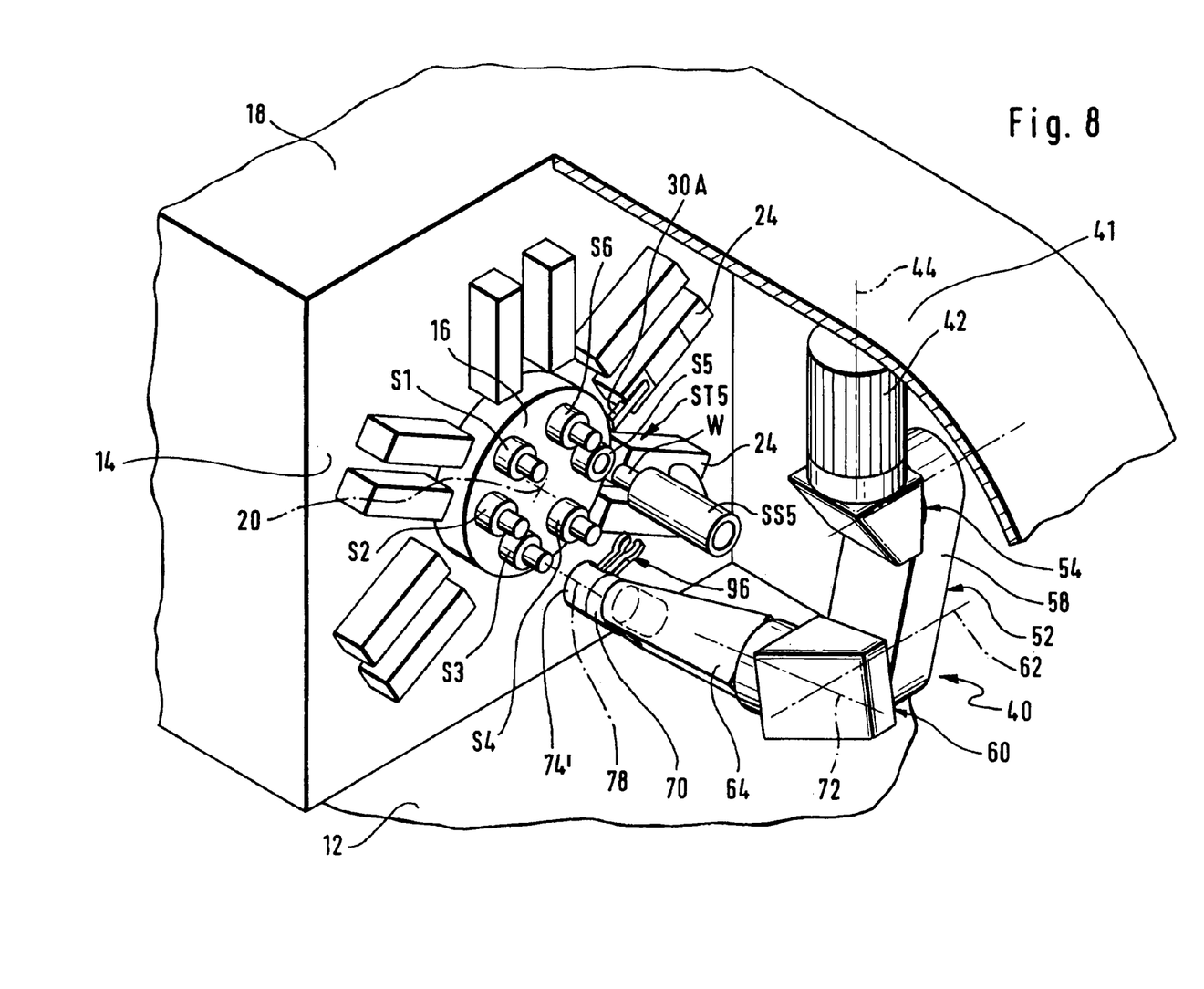
FIG. 8 shows an illustration similar to that presented in FIG. 4 for a third exemplary embodiment of a multi-spindle lathe according to the invention.

In a third exemplary embodiment of a multi-spindle lathe according to the invention, illustrated in FIG. 8, by way of example, the spindle station ST5 has an associated synchronous spindle SS5, which is held on a tool carrier 24 associated with this spindle station ST5 and with this tool carrier 24 can be moved into and back out of a position located coaxially with respect to the spindle axis A5.

Furthermore, the workpiece gripper 74' is designed as a shaft gripper and has a gripping jaw pair 96 which allows the workpiece W to be gripped even when it is held in the synchronous spindle SS5, so that the workpiece W can also be removed from or if appropriate inserted into the synchronous spindle SS5.

This creates the option of a workpiece W which has first been machined in the workpiece spindle S5 being accommodated both in the working spindle S5 and in the synchronous spindle SS5 in the spindle station ST5, so that it can parted off using a parting-off tool 30A which is held on the other tool carrier 24, associated with the spindle station ST5, and can move with this tool carrier toward the workpiece W.

The parted-off workpiece W held in the synchronous spindle SS5 can then be removed from the workpiece gripper 74' by means of the pivot-arm handling device 40 in the manner which has been described in connection with the exemplary embodiments given above and can be moved into the workpiece transfer space 92.

With regard to handling, the synchronous spindle SS5 can therefore be considered in the same way as a further workpiece spindle associated with the spindle station ST5.

Otherwise, the third exemplary embodiment corresponds entirely to the exemplary embodiments given above, so that the same parts are provided with the same reference symbols and reference is made in full to the explanations given above in connection with the preceding exemplary embodiments.

The invention claimed is:

1. Multi-spindle lathe, comprising a lathe frame, a spindle drum, which is mounted on the lathe frame such that it can rotate about a spindle drum axis and has an end face facing a working space, a multiplicity of workpiece spindles, which are mounted in the spindle drum in such a manner that they can rotate about spindle axes and have workpiece-accommodating means, which are disposed so as to face the working space and into which workpieces which are to be machined in the working space can be inserted, a pivot-arm handling device, the foot of which is disposed on an opposite side of the working space from the end face of the spindle drum and which is adapted in such a way that it can be used to insert workpieces into the workpiece-accommodating means of the workpiece spindles or to remove them therefrom, through the working space.

2. Multi-spindle lathe according to claim 1, wherein the pivot-arm handling device comprises a pivot-arm base, which can rotate with respect to the foot about a foot pivot axis running transversely with respect to the spindle drum axis.

3. Multi-spindle lathe according to claim 2, wherein an articulated arm with a first pivot joint, which has a first pivot axis running transversely with respect to the foot pivot axis, is mounted on the pivot-arm base, and in that the articulated arm includes a first arm, which leads from the first pivot axis, a second arm, which can be pivoted with respect to the first arm, by means of an articulated joint, about an axis of articulation which is parallel to the first pivot axis, and a gripper arm, which can pivot with respect to the second arm about a second pivot axis by means of a second pivot joint.

4. Multi-spindle lathe according to claim 3, wherein the second arm has an axis of rotation which runs transversely with respect to the axis of articulation and with respect to the second pivot axis and about which the second pivot joint can rotate with respect to the articulated joint.

5. Multi-spindle lathe according to claim 3, wherein the gripper arm has an axis of rotation which runs transversely with respect to the second pivot axis and about which a workpiece gripper can rotate with respect to the second pivot joint.

6. Multi-spindle lathe according to claim 2, wherein the foot pivot axis runs transversely with respect to a plane defined by a base surface of the lathe frame.

7. Multi-spindle lathe according to claim 2, wherein the foot pivot axis runs approximately perpendicular to the plane.

8. Multi-spindle lathe according to claim 2, wherein the foot pivot axis runs approximately in the vertical direction.

9. Multi-spindle lathe according to claim 2, wherein the foot pivot axis is disposed opposite a central region of the end face of the spindle drum.

10. Multi-spindle lathe according to claim 9, wherein the foot pivot axis runs close to the spindle drum axis.

11. Multi-spindle lathe according to claim 2, wherein the foot pivot axis intersects the spindle drum axis.

12. Multi-spindle lathe according to claim 1, wherein the foot is disposed hanging from a superstructure, which extends over and beyond the working space, of the lathe frame.

13. Multi-spindle lathe according to claim 1, wherein a workpiece transfer space is disposed at a lower level than the pivot-arm base.

14. Multi-spindle lathe according to claim 1, wherein the workpiece transfer space is disposed approximately at the level of a substructure of the lathe frame.

15. Multi-spindle lathe according to claim 1, wherein a workpiece transfer space is disposed in a region which extends in front of the end face of the spindle drum.

16. Multi-spindle lathe according to claim 15, wherein the workpiece transfer space is disposed between the end face and the foot.

17. Multi-spindle lathe according to claim 1, wherein the workpiece transfer space is disposed on an opposite side of the foot pivot axis from the working space.

18. Multi-spindle lathe according to claim 1, wherein the pivot-arm handling unit is adapted in such a manner that it allows access to workpieces disposed in all the workpiece spindles.

19. Multi-spindle lathe according to claim 1, wherein a control unit for the pivot-arm handling device is provided, which when conveying workpieces between the workpiece transfer space and the workpiece spindles, moves the articulated arm substantially in a plane running perpendicular to the axis of articulation and executes a rotation of the pivot-arm base about the foot pivot axis through less than 90°.

20. Multi-spindle lathe according to claim 1, wherein a control unit is provided, for the pivot-arm handling unit, which control unit, in order to insert and/or remove workpieces into/from the workpiece spindles, moves the pivot-arm base substantially only within an angular range about the foot pivot axis which corresponds to twice the angular range which is required in order to gain access to all the workpiece spindles in all the spindle stations.

21. Multi-spindle lathe according to claim 1, wherein the workpiece-accommodating means for the workpieces and tool carriers for tools are disposed on the same side of the working space.

* * * * *